J. A. MERONEY.
AIR HEATER AND DRIER.
APPLICATION FILED NOV. 4, 1919.
1,365,422. Patented Jan. 11, 1921.
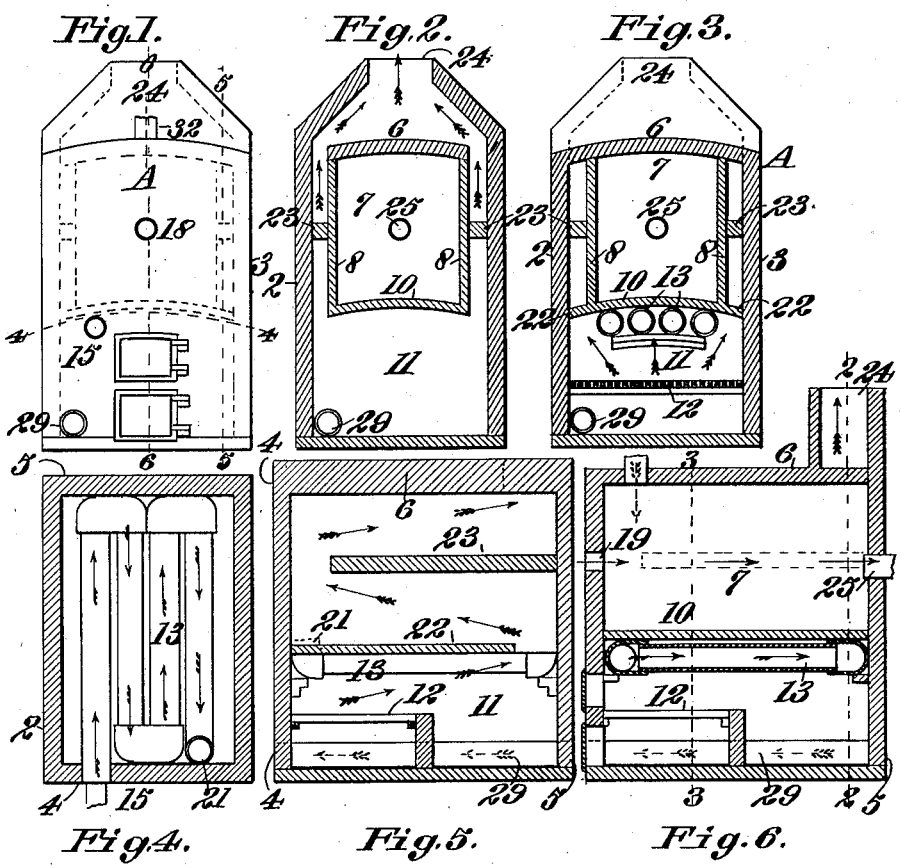
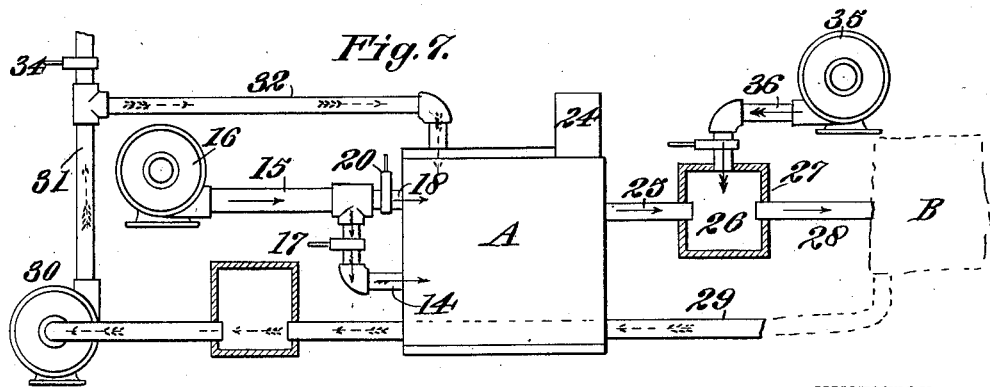
INVENTOR
John A. Meroney
BY Strong & Townsend
ATTORNEYS

UNITED STATES PATENT OFFICE.

JOHN A. MERONEY, OF SAN FRANCISCO, CALIFORNIA, ASSIGNOR TO CALIFORNIA EVAPORATING COMPANY, OF SANTA CLARA COUNTY, CALIFORNIA.

AIR HEATER AND DRIER.

1,365,422.  Specification of Letters Patent.  Patented Jan. 11, 1921.

Application filed November 4, 1919. Serial No. 335,633.

*To all whom it may concern:*

Be it known that I, JOHN A. MERONEY, a citizen of the United States, residing at the city and county of San Francisco and State of California, have invented new and useful Improvements in Air Heaters and Driers, of which the following is a specification.

This invention relates to an air heater and drier.

One of the objects of the present invention is to provide a simple, substantial and cheaply manufactured furnace for the heating and drying of air and especially a furnace for use in conjunction with evaporating or drying plants such as are employed for the purpose of drying fruits, vegetables, fish, meats and similar products. Another object of the invention is to provide means for maintaining a circulation of air through the furnace and the plant in which the drying takes place, and also to provide means for removing any moisture absorbed by the air during its passage through the drier or product to be dried.

Another object of the invention is to provide means for maintaining the air at practically any temperature desired and for liberating a portion or all of the moisture returning to the furnace.

Further objects will hereinafter appear.

The invention consists of the parts and the construction, combination and arrangement of parts as hereinafter more fully described and claimed, having relation to the accompanying drawings, in which—

Figure 1. is an end view of the furnace.

Fig. 2. is a vertical cross section on line 2—2 Fig. 6.

Fig. 3. is a vertical cross section on line 3—3 Fig. 6.

Fig. 4. is a plane section on line 4—4, Fig. 1.

Fig. 5. is a vertical longitudinal section on line 5—5, Fig. 1.

Fig. 6. is a vertical longitudinal section on line 6—6, Fig. 1.

Fig. 7. is a diagrammatic view of the air heater and drier showing the various fans by which a circulation of air is maintained.

Referring to the drawings in detail A, indicates in general a furnace constructed of brick or similar refractory material. The furnace consists of side walls, 2 and 3, end walls, 4 and 5, and a main top arch, 6. Arranged within the furnace is a central chamber, 7, which is formed by the side walls, 8, the top of which is formed by a portion of the arch 6, the side walls by the walls 8 and the bottom by the arch 10; the side walls 8 of the central chamber are spaced with relation to the side walls 2 and 3 to form passages, the function of which will hereinafter be described. Formed below the central chamber and extended from end to end of the furnace is a fire box, 11, in which is suitably arranged and supported a series of grate bars, 12, provided for the purpose of supporting combustible material, such as coal, wood or the like.

Arranged below the bottom arch, 10, and just above the grate bars, 12, are a series of connected tubes, 13. One end of the tubes connects with the bottom of the central chamber, 7, and communicates therewith, while the opposite end of the connected tubes is extended through the front end of the furnace, as at 14, and is connected with an air supplying pipe, 15, which in turn is connected with a fan or blower, 16, of suitable construction. The pipe 15 is connected by means of a T fitting with the pipe 14, and a damper, 17, is interposed between the T fitting and pipe 14 to regulate the volume of air passing therethrough or to entirely close communication between the pipes 14 and 15. Forming an extension of the pipe 15, or the T, mounted on the end thereof, is a pipe, 18. This pipe passes through the front end wall of the furnace and communicates with the central chamber 7 as shown at 19. The pipe 18 is also provided with a damper, as shown at 20, thus permitting the air delivered by the blower to be directed through the pipes 15 and 18 and through the central chamber or to be by-passed through the pipe 14 and the coils 13, formed thereon and then into the bottom portion of the central chamber through the opposite end of the coil shown at 21.

The passages formed between the exterior walls, 2 and 3, and the side walls, 8, of the central chamber are provided with baffle or deflecting plates, 22 and 23. See Figs. 2, 3 and 5. These baffle plates deflect the hot gases or products of combustion escaping from the fire box as indicated by the arrows in Fig. 5. The heat from the fire box is in this manner evenly circulated under the bottom of the central chamber and around the sides of the same and is finally permitted to escape by passing over the top of the arch into a stack indicated at 24. A high and even temperature may thus be maintained in the central chamber and air admitted thereto or circulated therethrough will thus be rapidly and efficiently heated.

One of the important features of the present invention is the construction of the central chamber and particularly in providing a moisture absorbing material, that is the top and bottom arches of the chamber, together with the side and end walls, are preferably constructed of unglazed brick, tile or the like. Such material has a great affinity and capacity for absorbing moisture and therefore forms an important feature of the present invention as one of the objects of the invention is first to heat the air, and secondly to remove any moisture contained therein.

The present furnace is especially constructed for use in conjunction with drying plants such as are employed for the drying of fruits, vegetables, fish, meats and other products. The diagrammatic view illustrated in Fig. 7 shows one method of connecting the same with a drying plant. The pipes, 14 and 15, by which air is admitted to the central chamber are in this instance shown as connected with the fan or blower, 16, which takes cold air directly from the atmosphere. This air is delivered to the central chamber either directly through the pipe, 18, or by by-passing it through the coils, 13, which are also constructed of tile or brick. The air after passing through the central chamber is then discharged through a pipe, 25, and is first admitted to a chamber, 26, which is formed in a housing, 27. The air is then delivered to the drying plant, diagrammatically illustrated at B, by means of the pipe, 28, and is permitted to circulate through the drying plant in any suitable manner. The air after circulation or passage through the drying plant may be permitted to freely discharge or may be returned to be reheated and dried if desired. In such instances a return pipe, 29, is provided. This pipe passes through the fire box of the furnace, as shown in the drawings, and is connected with the suction side of an exhaust blower, 30, as in Fig. 7. The opposite side of the blower is connected with a pipe, 31, which may expel the air or which may deliver it to a return pipe, 32, directly connected with the central chamber, 7. The air employed may in this manner circulate over and over again and any moisture absorbed during the passage of the air through the central chamber, 7, or the coils, 13, due to the material employed and the temperature of the same, that is as previously stated, unglazed brick or tile, forms the top, bottom, ends and side walls of the central chamber and as these have great capacity for absorbing moisture and considerable affinity for the same, it is obvious that it is an ideal means for quickly removing any moisture. This is of importance as it permits a considerable conservation of heat, that is the moist air returning from the drying plant, contains considerable heat and is, under practically all conditions, at least warmer than the exterior atmosphere and as it is possible to readily remove the moisture by merely returning it through the heating chamber, 7, it is obvious that re-circulation is of considerable advantage. Furthermore, added heat may be transmitted to the returning air as return pipe 29 passes through the fire box.

If under certain conditions it is found that the returning air contains too much moisture, it is only necessary to open a damper, 34. This damper may permit release of all returning air or a portion of the same, or may be entirely closed to permit complete re-use of the air. If it is desired to vary the temperature of the air entering the drying plant through the pipe, 28, it is possible to employ a blower, such as shown at 35. This blower takes air from the atmosphere and delivers it to the chamber 26 by means of a pipe 36. This pipe is also provided with a damper and it is therefore possible to regulate the volume of air admitted or to entirely close the same if desired. Any air temperature may therefore be obtained and maintained by additional cold air without varying the furnace temperature in any manner.

While the furnace shown in the present instance embodies certain specific structural features, I wish it understood that various changes in construction and proportion may be resorted to within the scope of the appended claims, similarly that the materials and finish of the several parts employed may be such as the experience and judgment of the manufacturer may dictate or various uses may demand.

Having thus described my invention what I claim and desire to secure by Letters Patent is—

1. An air heating and drying furnace, comprising a housing, a central chamber formed in the housing having air inlet and discharge openings connecting therewith, a fire box positioned below the central chamber, means permitting circulation of the products of combustion escaping from the fire box under, around and over the central chamber, and means for circulating air through the central chamber.

2. An air heating and drying furnace, comprising a housing, a central chamber formed in the housing having air inlet and discharge openings connecting therewith, a fire box positioned below the central chamber, means permitting circulation of the products of combustion escaping from the fire box under, around and over the central chamber, means for circulating air through the central chamber, and said central chamber having its walls composed of a moisture absorbing material.

3. An air heating and drying furnace, comprising a housing, a central chamber formed in the housing having air inlet and discharge openings connecting therewith, a fire box positioned below the central chamber, means permitting circulation of the products of combustion escaping from the fire box under, around and over the central chamber, means for circulating air through the central chamber, and said central chamber having its side walls and top and bottom composed of a moisture absorbing refractory material.

4. The combination, in a drier and an air heating furnace connected therewith, of a central chamber formed in the furnace, means for circulating products of combustion over, under and around the central chamber, a blower connected with the central chamber, adapted to deliver air thereto, a discharge pipe connecting the central chamber with the drier, a return pipe for the air also connected with the drier, and means for re-circulating the returning air by connecting the return pipe with the central chamber.

5. The combination in a drier and an air heating furnace connected therewith, of a central chamber formed in the furnace, means for circulating products of combustion over, under and around the central chamber, a blower connected with the central chamber, adapted to deliver air thereto, a discharge pipe connecting the central chamber with the drier, a return pipe for the air also connected with the drier, means for re-circulating the returning air by connecting the return pipe with the central chamber, and means for liberating a portion or all of the returning air.

6. The combination in a drier and an air heating furnace connected therewith, of a central chamber formed in the furnace, means for circulating products of combustion over, under and around the central chamber, a blower connected with the central chamber, adapted to deliver air thereto, a discharge pipe connecting the central chamber with the drier, a return pipe for the air also connected with the drier, means for re-circulating the returning air by connecting the return pipe with the central chamber, and means for adding cold air to the hot air discharging from the central chamber.

7. The combination in a drier and an air heating furnace connected therewith, of a central chamber formed in the furnace, means for circulating products of combustion over, under and around the central chamber, a blower connected with the central chamber, adapted to deliver air thereto, a discharge pipe connecting the central chamber with the drier, a return pipe for the air also connected with the drier, means for re-circulating the returning air by connecting the return pipe with the central chamber, means for adding cold air to the warm air discharging from the central chamber of the furnace and means for liberating all or a portion of the returning air.

8. The combination with drier and a furnace for heating air therefor, of a central chamber formed in the furnace, a fire box in the furnace, flues formed under, over and around the sides of the central chamber, through which the products of combustion are adapted to escape, a blower adapted to deliver air to the central chamber, a discharge pipe connecting the central chamber with the drier, an air heating coil disposed in the furnace box, below the central chamber, means for directing the air from the blower through said coil and then into the central chamber, and a damper for closing connection between the blower and the coil to permit the air to be delivered directly to the central chamber.

9. The combination with drier and a furnace for heating air therefor, of a central chamber formed in the furnace, a fire box in the furnace, flues formed under, over and around the sides of the central chamber, through which the products of combustion are adapted to escape, a blower adapted to deliver air to the central chamber, a discharge pipe connecting the central chamber with the drier, an air heating coil disposed in the furnace box, below the central chamber, means for directing the air from the blower through said coil and then into the central chamber, a damper for closing connection between the blower and the coil to permit the air to be delivered directly to the central chamber, and a second damper adapted to be closed when the air is to be directed through the heating coil before entering the central chamber.

10. The combination with drier and a furnace for heating air therefor, of a central chamber formed in the furnace, a fire box in the furnace, flues formed under, over and around the sides of the central chamber, through which the products of combustion are adapted to escape, a blower adapted to deliver air to the central chamber, a discharge pipe connecting the central chamber with the drier, an air heating coil disposed in the furnace box, below the central chamber, means for directing the air from the blower through said coil and then into the central chamber, a damper for closing connection between the blower and the coil to permit the air to be delivered directly to the central chamber, a second damper adapted to be closed when the air is to be directed through the heating coil before entering the central chamber, means for adding cold air to the hot air discharging from the central chamber, and means for regulating the volume of cold air supplied.

11. The combination with drier and a furnace for heating air therefor, of a central chamber formed in the furnace, a fire box in the furnace, flues formed under, over and around the sides of the central chamber, through which the products of combustion are adapted to escape, a blower adapted to deliver air to the central chamber, a discharge pipe connecting the central chamber with the drier, an air heating coil disposed in the furnace box, below the central chamber, means for directing the air from the blower through said coil and then into the central chamber, a damper for closing connection between the blower and the coil to permit the air to be delivered directly to the central chamber, a second damper adapted to be closed when the air is to be directed through the heating coil before entering the central chamber, means for adding cold air to the hot air discharging from the central chamber, means for regulating the volume of cold air supplied, a return pipe connecting the drier with the furnace and means for liberating a portion or all of the air returning through the return pipe or for directing it to the central chamber for re-circulation.

12. The combination with drier and a furnace for heating air therefor, of a central chamber formed in the furnace, a fire box in the furnace, flues formed under, over and around the sides of the central chamber, through which the products of combustion are adapted to escape, a blower adapted to deliver air to the central chamber, a discharge pipe connecting the central chamber with the drier, an air heating coil disposed in the furnace box, below the central chamber, means for directing the air from the blower through said coil and then into the central chamber, a damper for closing connection between the blower and the coil to permit the air to be delivered directly to the central chamber, a second damper adapted to be closed when the air is to be directed through the heating coil before entering the central chamber, means for adding cold air to the hot air discharging from the central chamber, means for regulating the volume of cold air supplied, a return pipe connecting the drier with the furnace, means for liberating a portion or all of the air returning through the return pipe or for directing it to the central chamber for re-circulation, and said central chamber having walls composed of moisture absorbing material adapted to absorb and remove the moisture contained in the air.

13. In a device of the character described a drier, an air heater, means for maintaining a body of air in constant circulation through the drier and the heater, and means coöperating therewith for continuously removing moisture absorbed by the air during its passage through the drier.

14. In a device of the character described a drier, an air heater, pipes connecting the drier and the heater, means for maintaining a body of air in constant circulation through the drier and the heater, and means in the heater for removing moisture absorbed by the air during its passage through the drier.

15. In a device of the character described a drier, an air heater, pipes connecting the drier and the heater, means for maintaining a body of air in constant circulation through the drier and the heater, and a moisture absorbing material in the heater adapted to remove the moisture absorbed by the air during its passage through the drier.

In testimony whereof I have hereunto set my hand in the presence of two subscribing witnesses.

JOHN A. MERONEY.

Witnesses:
JOHN H. HERRING,
W. W. HEALEY.